Nov. 17, 1970     W. J. MORRILL     3,541,493

MOLDED PLUG-IN CONNECTOR FOR MOTOR

Filed March 13, 1968

INVENTOR
WAYNE J. MORRILL
BY
Hood, Gust, Irish & Lundy
ATTORNEYS

United States Patent Office 3,541,493
Patented Nov. 17, 1970

3,541,493
MOLDED PLUG-IN CONNECTOR FOR MOTOR
Wayne J. Morrill, 3448 S. Washington Road,
Fort Wayne, Ind. 46804
Filed Mar. 13, 1968, Ser. No. 712,822
Int. Cl. H01r 9/16
U.S. Cl. 339—62     7 Claims

ABSTRACT OF THE DISCLOSURE

Connector means for providing external connections to electrical apparatus disposed in a housing, the connector means comprising insulative mounting means, a pair of contact elements carried by the mounting means and held in a spaced apart relationship thereby and means for securing the mounting means to a wall of the housing. The contact elements are proportioned and designed to penetrate the wall and the mounting means provides sleeve portions encasing the portions of the contact elements which penetrate the wall, thereby insulating the contact elements from the housing. Preferably, the mounting means is fabricated from a resilient, rubber-like material whereby each contact element can move slightly relative to the other contact element and relative to the wall. Also, preferably, the securing means comprises adhesive means arranged to provide a water-tight seal between the wall and the mounting means. The structure of the connector means is manifestly compact, but provides ample creepage distances between the contact elements and between each contact element and the housing.

BACKGROUND OF THE INVENTION

Field of the invention

The present invention relates to electrical apparatus, and more particularly to a connector assembly for providing external connections to electrical apparatus disposed in a housing. The connector assembly of the present invention is ideally suited for providing external plug-in type connections to motor windings.

Description of the prior art

Conventionally, small electric motors of the type used in air moving applications such as in refrigerators, air conditioners, etc., have employed integrally connected leads, i.e., lead wires connected directly to the windings of the motor. Thus, since many motors differ only in lead arrangement, when leads are connected directly to the winding, a wide variety of motors must be manufactured and stocked. By employing plug-in type connections, savings can be effected by manufacturing and stocking a "standard" motor and, then, providing a variety of leads and plugs which can be used to modify the "standard" motor.

Recently, motor manufacturers have been employing plug-in type connectors to provide connections to the field windings. However, it has been difficult to provide a plug-in connection for a motor in such a way that tension on the external leads will not cause some internal electrical problems such as, for instance, pulling the internal connections away from the coil windings.

SUMMARY OF THE INVENTION

The present invention comprises, in combination, wall means defining at least a portion of a housing for containing electrical apparatus, and connecting means, the wall means having a pair of spaced apart apertures formed therein. The connecting means comprises insulative mounting means and a pair of contact elements carried by the mounting means and held in a spaced apart relationship thereby. One of the contact elements extends inwardly through one of the apertures and the other of the contact elements extends inwardly through the other of the apertures, the mounting means providing sleeve portions encasing the portions of the contact elements extending through the apertures, thereby insulating each contact element from the wall means.

Conductor means are provided for connecting the inner end of each contact element to such electrical apparatus and adhesive means is provided for securing the mounting means to the wall means. Preferably, the mounting means comprises a member fabricated from a resilient, rubber-like material whereby each contact element can move slightly relative to the other contact element and relative to the wall means. Also, preferably, the adhesive means is arranged to provide a water-tight seal between the wall means and the mounting means. The structure of the mounting means provides ample creepage distance between the contact elements and between each contact element and the wall means.

Further, preferably, the above-mentioned conductor means comprises a wire connected to the inner end of each contact element, a portion of each wire being encased by the sleeve portion encasing its associated contact element. The exposed portions of these wires are preferably encased by insulative tubes which are held in a spaced apart relationship by web means disposed between the tubes.

The outer portions of the contact elements, i.e., the portions extending outwardly from the wall means, are exposed for mating contact with a second pair of contact elements, the second pair being connected to lead wires which are arranged to be connected to a power source.

It will be appreciated that the connector means of the present invention is ideally suited for providing external connections to the field windings of small electric motors. The two spaced apart apertures may be formed in the end bell of a motor housing at the same time that other machining operations thereon are performed. Preferably, the wires which are connected to the inner ends of the contact elements will extend generally axially through one of the slots of the stator, the distal ends of such wires being connected to the wires comprising the field windings. As will be discussed hereinafter, the connections between the contact elements and the field windings are made in such a manner that slight movement of the contact elements will not place a stress on the wires comprising the field windings.

It is an object of the present invention, therefore, to provide compact connector means ideally suited for providing external connections to electrical apparatus disposed in a housing, which connector means comprises mounting means providing ample creepage distances between the conductive components thereof.

Another object of the present invention is to provide a connector means ideally suited for providing plug-in type external connections for the field windings of small electric motors.

Still another object of the present invention is to provide such a connecting means which will permit slight movement of the contact elements thereof without damage to the connections made to such contact elements on the inside of the housing.

Other objects and features of the present invention will become apparent as this description progresses.

The above-mentioned and other features and objects of this invention and the manner of attaining them will become more apparent and the invention itself will be best understood by reference to the following description of an embodiment of the invention taken in conjunction with the accompanying drawings wherein:

DESCRIPTION OF THE PREFERRED EMBODIMENT

Figure 1:
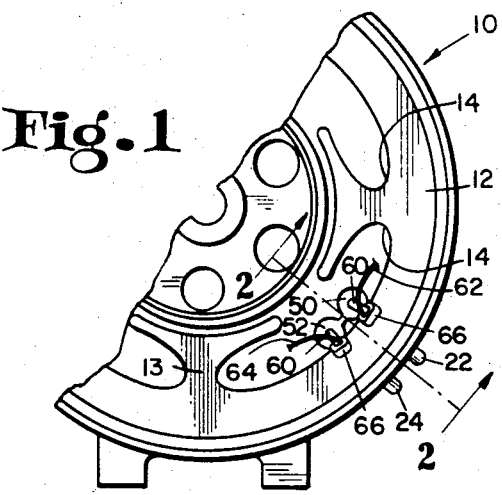
FIG. 1 is a fragmentary view looking downwardly into the end bell of a typical small electric motor.

Referring now to the drawings, it will be seen that there is illustrated a conventional end bell 10 of a small, shaded pole electric motor, and conventional stator laminations 12 arranged in the end bell to define the conventional pole pieces 13 which receive the field windings (not shown). The slots 14 defined between the pole pieces 13 extend axially as illustrated.

Figure 2:
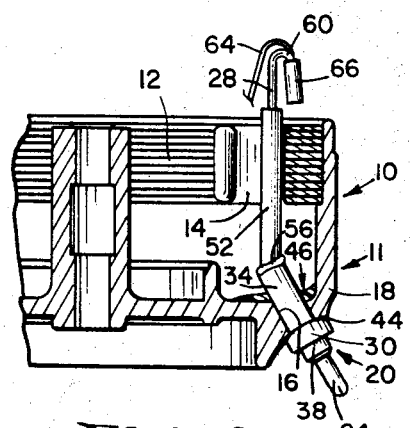
FIG. 2 is a fragmentary, sectional view taken from FIG. 1 generally along the line 2—2.

The end bell 10 is conventionally fabricated by casting metal to the desired size and shape and then machining the casting to provide the necessary bearing and mounting surfaces. The connector means 11 of the present invention utilizes a pair of spaced apart apertures 16 (only one of which is shown in FIG. 2) in the wall portion 18 of the end bell 10. These apertures 16 can be conveniently drilled at the same time that the various mounting and bearing surfaces are being machined.

The connector means 11 comprises an insulative mounting member 20 and a pair of tubular male contact elements 22 and 24 carried by the insulative member 20 and held in a spaced apart relationship thereby. A lead wire 26, 28 is inserted into the open end of each contact element 22, 24 (FIG. 4) and the contact element is crimped or otherwise deformed to secure the wire 26, 28 thereto. These wires 26, 28 are preferably relatively stiff copper wires.

Figure 3:
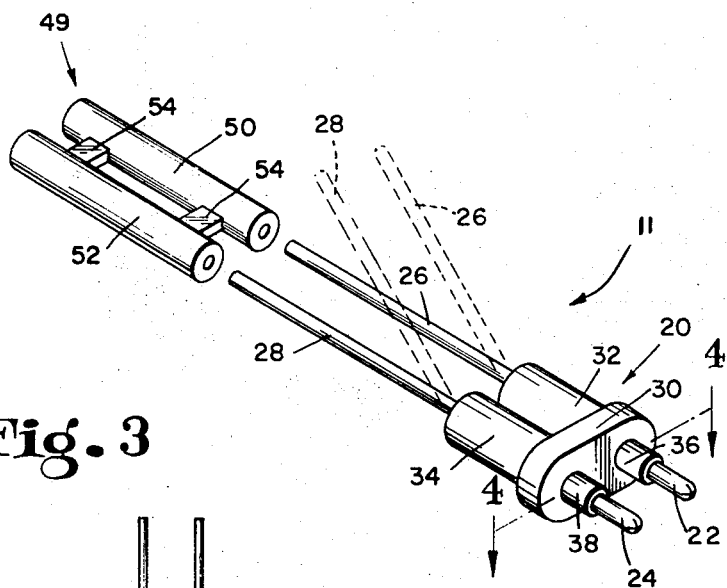
FIG. 3 is an exploded perspective view showing the connector means of the present invention.
Figure 4:
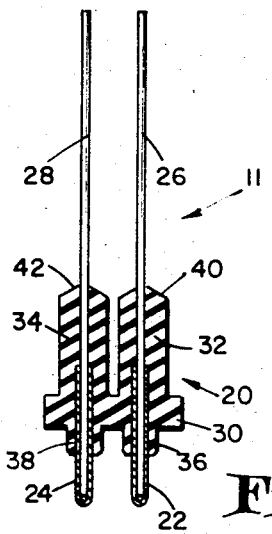
FIG. 4 is a sectional view taken from FIG. 3 generally along the line 4—4.

The mounting member 20 preferably comprises a main body portion 30, sleeve portions 32, 34 encasing the rear end portion of each contact element 22, 24 and a portion of the wire 26, 28 connected thereto, and sleeve portions 36, 38 encasing a portion of the outer end of each contact element 22, 24. The mounting member 20 is preferably formed by molding a resilient, rubber-like material about the contact elements 22, 24 and wires 26, 28 while they are held in the parallel, spaced apart relationship, as seen in FIGS. 3 and 4.

A suitable material for the mounting member 20 is 65 durometer neoprene rubber. The resilience of the member 20 permits slight movement of each contact element 22, 24 relative to the other contact element and relative to the apertures 16 through which the rear portions of the contact elements extend. Specifically, the sleeve portions 32, 34, which extend, respectively, through the apertures 16 and the main body portion 30 which connects the sleeve portions 32, 34 is sufficiently resilient to permit slight movement of either contact element 22, 24 relative to the wall portion 18 of the end bell 10. The amount of such movement is determined by the resilience of the member 20 and the dimensions of the various portions of the member. The end 40, 42 of each sleeve portion 32, 34 is bevelled as shown in FIG. 4 to facilitate insertion of the sleeve portion into its respective aperture 16.

Preferably, a non-water soluble adhesive is deposited onto the outer surface 44 of the wall portion 18 surrounding the apertures 16, on the walls of the apertures 16 and on the inside surface of the wall portion 18 and, before the adhesive is cured, the sleeve portions 32, 34 are inserted into their respective apertures 16 as illustrated in FIG. 2. Preferably, the adhesive on the inside surface of the wall portion 18 is built up as indicated by the reference numeral 46 to provide a fillet of adhesive about each sleeve portion 32, 34. This non-water soluble adhesive provides a water-tight seal between the wall portion 18 and the member 20.

An insulative tube assembly 49 is provided comprising tubes 50, 52 sleeved over each wire 26, 28, the tubes 50, 52 being held in a spaced apart relationship by web means 54 disposed therebetween. These web means 54 hold the tubes 50, 52 and, consequently, the wires 26, 28 in a spaced apart relationship. Each tube 50, 52 is connected to a respective sleeve portion 32, 34 by adhesive means such as indicated by the reference numeral 56 in FIG. 2.

Each wire 26, 28 is bent, as suggested by the dashed-line drawing thereof in FIG. 3, so that the portion of the wire extending away from its sleeve portion 32, 34 will extend axially through the slot 14 generally aligned with the apertures 16. Further, the distal end portion of each wire 26, 28 is rebent as indicated by the reference numeral 60 in FIG. 2. In FIGS. 1 and 2, it will be seen that an internal lead wire 62, 64, only a fragment of which is shown, is connected to the rebent end portion of each wire 26, 28 by means such as the illustrated clips 66. The wires 62, 64 comprise the ends of conventional field coil windings (not shown) which are normally disposed on the pole pieces 13. Preferably, the illustrated clips 66 are crimped onto the rebent portions of the wires 26, 28 to connect the wires 62, 64, respectively, thereto without the benefit of solder. The rebent portions of the wires 26, 28 are held apart by the web means 54 to prevent contacting of the clips 66.

The structure of the connector means just described is such that slight movement of the contact elements 22, 24 will have no effect on the connections to the wires 62 and 64. That is, the slight movement of the male contact elements 22, 24 normally associated with making contact to such elements will have no effect on the connections provided by the clips 66.

Figure 5:
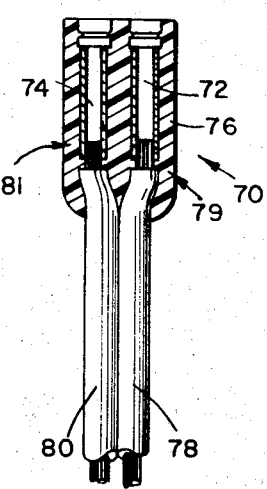
FIG. 5 is a fragmentary view, partially sectioned, showing a female connector means of the type which can be releasably connected to the connector means of FIG. 3.

Referring now to FIG. 5, a suitable female connector means 70 for making contact to the contact elements 22 and 24 will be discussed. The female connector means 70 comprises female contact elements 72, 74 for the respective male contact elements 22, 24, the female contact elements being carried by an insulative member 76 and held in a spaced apart relationship thereby. The insulative member 76 may also be molded from a resilient material such as neoprene. An insulated lead wire 78 is crimped to the rear end of the female contact element 72 as indicated at 79 and another insulated lead wire 80 is crimped to the rear end of the female contact element 74 as indicated at 81. These lead wires 78, 80 are arranged to be connected to a conventional power source for energizing field windings of the motor. The illustrated structure of each female contact element 72, 74 is conventional and, therefore, need not be discussed in detail in this description.

In one illustrative embodiment of the present invention, the mounting member 20 was fabricated of 65 durometer neoprene rubber and the sleeve portions 32, 34 thereof were formed with a diameter of .218 inch. In that embodiment, the contact elements 22, 24 were .093 inch in diameter and the apertures 16 were .218 inch in diameter, the centers of the apertures 16 being spaced apart .250 inch. The wall thickness of each sleeve portions 32, 34 of that embodiment provided ample creepage distances between the contact elements 22, 24 and the wall portion 18. Further, these wall thicknesses permitted slight movement of each contact element 22, 24. It will be understood, however, that the mounting member 20 and the insulative member 76 may be molded from a non-resilient plastic provided the male contact members 22, 24 and female contact members 72, 74 are accurately positioned for proper engagement.

The tube assembly 49 is an important element of the present invention because it maintains proper spacing betfeen wires 26 and 28 from the member 20 to the opposite side of the stator core when the internal connections are made with the clips 66. The webs 54 hold the tubes 50, 52 apart to provide ample creepage distances between the wires 26 and 28 and the thicknesses of the tubes 50, 52 provide amples creepage distances between each wire 26, 28 and the laminations 12. If the tube assembly 49 with the webs 64 is not utilized, the wires 26, 28 may be deformed, i.e., brought too close together or too close to the laminations 12, when the clips 66 are applied. The tube assembly 49 can be arranged so that the winding itself can support the assembly and help reduce movement of the junctions between the winding wires 62, 64 and the wires 26, 28, while, at the same time, maintaining proper spacing between wires of opposite polarity.

While there have been discussed above the principles of this invention in conjunction with specific apparatus, it is to be clearly understood that this description is made by way of example and not as a limitation to the scope of the invention.

What is claimed is:

1. Means for providing external connections to electrical apparatus comprising a housing, said housing having a pair of spaced, parallel openings in a wall thereof, insulative mounting means, a pair of contact elements carried by said mounting means and held in spaced apart, parallel relationship threby, said contact elements having parallel portions arranged to penetrate said wall openings, said mounting means including sleeve portions respectively encasing said portions of said contact elements and respectively extending through said wall openings thereby insulating said contact elements from said housing, means for securing said mounting means to said wall, parallel conductor means arranged to connect said contact elements to such an electrical apparatus, said conductor means comprising wires respectively connected to each of said contact elements, and a pair of insulative tubes respectively receiving said wires, and means for holding said tubes in spaced apart, parallel relationship.

2. Means for providing external connections to electrical apparatus comprising a housing, said housing having a pair of spaced, openings in a wall thereof, insulative mounting means, a pair of contact elements carried by said mounting means and held in spaced apart, relationship thereby, said contact elements having portions arranged to penetrate said wall openings, said mounting means including sleeve portions respectively encasing said portions of said contact elements and respectively extending through said wall openings thereby insulating said contact elements from said housing, means for securing said mounting means to said wall, said mounting means being formed from a resilient, rubber-like material whereby each of said contact elements can move slightly relative to the other contact element and relative to such a wall, conductor means arranged to connect said contact elements to such an electrical apparatus, said conductor means comprising wires respectively connected to each of said contact elements, a portion of each wire being encased by the sleeve portion encasing its associated contact element, and sleeve means comprising a pair of insulative tubes receiving, respectively, said wires and means for holding said tubes in a spaced apart relationship, said securing means comprising adhesive means arranged to provide a water-tight seal between said mounting means and such a wall.

3. In combination, wall means defining at least a portion of a housing for containing electrical apparatus, and connecting means, said wall means having a pair of spaced apart, parallel apertures formed therein, said connecting means comprising insulative mounting means, a pair of contact elements carried by said mounting means and held in a spaced apart, parallel relationship thereby, one of said contact elements extending inwardly through one of said apertures and the other of said contact elements extending inwardly through the other of said apertures, said mounting means including sleeve portions respectively encasing the portions of said contact elements extending through said apertures thereby insulating said contact elements from said wall means, conductor means for connecting the inner end of each of said contact elements to such electrical apparatus, and adhesive means for securing said mounting means to said wall means, said conductor means comprising a wire connected to the inner end of each contact element, a portion of each wire being encased by the sleeve portion encasing its associated contact element.

4. The combination of claim 3 comprising sleeve means insulating each of said wires, said sleeve means comprising a pair of insulative tubes receiving, respectively, said wires and web means holding said tubes in a spaced apart generally parallel relationship.

5. In combination, a motor housing and means for providing an external connection to the field windings contained in said motor housing, said housing having a pair of spaced apart apertures formed in the end bell thereof, said connecting means comprising mounting means, a pair of contact elements carried by said mounting means and held in a spaced apart relationship thereby, one of said contact elements extending inwardly through one of said apertures and the other of said contact elements extending inwardly through the other of said apertures, said mounting means providing sleeve portions encasing the portions of said contact elements extending through said apertures thereby insulating said contact elements from said housing, the wall thicknesses of said sleeve portions providing sufficient creepage distances between said contact elements and said housing, conductor means for connecting the inner end of each of said contact elements to such field windings, and adhesive means for securing said mounting means to said housing.

6. The combination of claim 5 wherein said mounting means comprises a member formed of a resilient material whereby each of said contact elements can move slightly relative to the other contact element and relative to said housing, said member having a main body portion from which said sleeve portions extend, said main body portion providing sufficient creepage distances between said contact elements.

7. The combination of claim 5 wherein said conductor means comprises a wire connected to the inner end of each contact element, a portion of each wire being encased by the sleeve portion encasing the contact element connected thereto, and further comprising a plurality of laminations in said housing defining generally axially extending slots, and said wires extending generally axially through one of said slots, a pair of insulative tubes receiving, respectively, said wires, and means for holding said tubes in a spaced apart, generally parallel relationship, whereby said wires are held generally in alignment with their respective contact elements.

References Cited

UNITED STATES PATENTS

| 2,186,578 | 1/1940 | Doughman | 339—62 X |
| 2,218,830 | 10/1940 | Rose et al. | 339—102 X |
| 2,429,955 | 10/1947 | Goldsmith | 174—153 |
| 2,657,368 | 10/1953 | Cooke | 339—61 X |
| 2,802,958 | 8/1957 | Curley | 339—126 X |
| 2,976,512 | 3/1961 | Vallee | 339—126 X |
| 3,102,248 | 8/1963 | Temple | 339—62 X |
| 3,337,833 | 8/1967 | Creedon | 339—221 X |
| 3,388,368 | 6/1968 | Sauber | 339—94 |

FOREIGN PATENTS

| 775,739 | 5/1957 | Great Britain. |
| 693,210 | 8/1930 | France. |

RICHARD E. MOORE, Primary Examiner

U.S. Cl. X.R.

339—64, 102, 125